US007057685B2

(12) United States Patent
Funamoto et al.

(10) Patent No.: US 7,057,685 B2
(45) Date of Patent: Jun. 6, 2006

(54) REFLECTIVE PLATE, LIQUID CRYSTAL DISPLAY (LCD) USING SAME, AND ELECTRONIC APPARATUS USING THIS LCD

(75) Inventors: Akihiro Funamoto, Kyoto (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 113 days.

(21) Appl. No.: 10/097,481

(22) Filed: Mar. 14, 2002

(65) Prior Publication Data
US 2002/0159009 A1 Oct. 31, 2002

(30) Foreign Application Priority Data
Mar. 14, 2001 (JP) ............................. 2001-072468

(51) Int. Cl.
*G02F 1/1335* (2006.01)
(52) U.S. Cl. ..................................................... 349/113
(58) Field of Classification Search ......... 349/113–115
See application file for complete search history.

(56) References Cited

U.S. PATENT DOCUMENTS

| 5,128,787 A * | 7/1992 | Blonder ..................... 349/113 |
| 6,097,458 A * | 8/2000 | Tsuda et al. ................ 349/113 |
| 6,285,426 B1 * | 9/2001 | Akins et al. ................ 349/114 |
| 6,563,559 B1 * | 5/2003 | Noritake .................... 349/113 |
| 6,774,964 B1 * | 8/2004 | Funamoto et al. .......... 349/113 |

OTHER PUBLICATIONS

Patent Abstracts of Japan, Publication No. 2001-021707, dated Jan. 26, 2001, 3 pages.
Patent Abstracts of Japan, Publication No. 10-177106, dated Jun. 30, 1998, 3 pages.
Patent Abstracts of Japan, Publications No. 07-181481, dated Jul. 21, 1995, 2 pages.
Patent Abstracts of Japan, Publication No. 10-013355, dated Jan. 16, 1998, 2 pages.

* cited by examiner

*Primary Examiner*—Andrew Schechter
*Assistant Examiner*—Richard Kim
(74) *Attorney, Agent, or Firm*—Osha Liang LLP

(57) ABSTRACT

A reflective plate is offered which is capable of forming an exit region of reflected light in an effective field of view area in an obliquely above or below position. The reflective plate has plural reflective subregions each having reflective surfaces for reflecting light. Light rays reflected from the reflective subregions form plural spreads of exit which intersect each other at a given upper position to thereby form a common exit region. The reflective subregions are so arranged that light entering the reflective plate from a vertical direction is reflected by the reflective subregions substantially toward the center of the exit region lying outside a region that is vertically above the reflective plate. The centers of the intensities of the reflected light rays concentrate at the center of the exit region.

6 Claims, 17 Drawing Sheets

SHAPE OF REFLECTIVE
SUBREGION A

SHAPE OF REFLECTIVE
SUBREGION B

CONTOUR LINES

CONTOUR LINES (PRIOR ART)

REFLECTIVE PLATE, LIQUID CRYSTAL DISPLAY (LCD) USING SAME, AND ELECTRONIC APPARATUS USING THIS LCD

BACKGROUND OF INVENTION

The present invention relates to a reflective plate used in a reflective type display. The invention also relates to a liquid crystal display (LCD) using such a reflective plate. Furthermore, the invention relates to electronic apparatus using such a liquid crystal display.

In recent years, liquid crystal displays have been applied to personal computers (PCs), TV receivers, wordprocessors, video taperecorders, and so on. Meanwhile, such electronic apparatus have been required to have more functions. Also, there is a demand for miniaturization, power saving, and lower costs. For these purposes, there is a demand for a reflective type liquid crystal display that displays a liquid crystal image by reflecting externally incident light without using backlight.

It is important for such a reflective type liquid crystal display that an image is created by making efficient use of externally incident light without using backlight.

As shown in FIG. 16A, a reflective film 4 used in a reflective type liquid crystal display is placed below a liquid-crystal layer 38 and reflects incident ambient light. A part of the ambient light is reflected by the surface of an upper substrate 2; the remaining ambient light passes through the upper substrate 2 and the liquid-crystal layer 38 and is reflected by the reflective film 4. Therefore, if the direction of reflection of light at the surface of the upper substrate 2 is identical with the direction of reflection of light at the reflective film 4, the light source is seen to overlap the image on the liquid crystal display. This presents the problem that the image is not viewed comfortably, i.e., the visibility is deteriorated.

Accordingly, an arrangement of a pattern consisting of a multiplicity of irregularities 3 on the surface of the reflective film 4 as shown in FIG. 16B has been proposed. As shown in FIG. 16C, the irregularities 3 reflect incident light. Where light incident on the reflective film 4 is reflected by the irregularities 3, the LCD screen can be visually observed using light not directed in the same direction as those components of the scattered light which are regularly reflected at the upper substrate 2. It is possible to observe the LCD screen from a direction different from the light regularly reflected off the upper substrate 2. This improves the visibility.

As shown in FIG. 17B, the angle of reflection α can be adjusted by appropriately selecting the tilt angle at the surface of convex portion 3a. The light not directed in the same direction as the light regularly reflected from the surface of the upper substrate 2 can be guided to the view position.

However, if the surfaces of the irregularities 3 are formed at the same tilt angle, and if the irregularities are uniform in shape over the whole reflective film 4, it follows that incident light is reflected even from directions not used for observation of the LCD screen. Light is reflected even in wasteful directions. This deteriorates the efficiency of utilization of light.

In particular, as shown in FIG. 17A, if each irregularity 3 is made to have a minute area, and if light incident normal to the reflective film 4 spreads within angle α, the light reflected by the reflective film 4 is reflected to regions II, III, and IV (FIG. 17A) excluding both-side regions I that light reflected from the reflective film 4 does not reach at all.

With respect to the regions II of these regions, only light reflected from parts (αL and αR, respectively) of the reflective film 4 reaches the regions II. With respect to the region IV, light reflected from the whole reflective film 4 reaches the region IV. However, the contrast of the LCD screen is impaired due to regular reflection from the upper substrate 2. This makes it difficult to recognize the image.

With respect to the regions III, light reflected from the left side αL and the right side αR of the reflective plate 1 reaches these regions III. Since these regions are not affected by regular reflection from the upper substrate 2, the image on the LCD screen can be recognized.

Therefore, it is desirable to use the regions III as an effective field of view area that is a viewable LCD screen.

However, these effective field of view areas III are formed like a doughnut around the region IV located at the center. We now consider a case in which these effective field of view areas are used for cellular phones. In the case of a reflective LCD screen, if there is a light source incident normal to the upper substrate, it is impossible to view the LCD screen from just above. Therefore, one inevitably views the screen at an angle. At this time, if he or she views from a sideways direction, observation of other persons is facilitated. Consequently, it is natural that he or she views the screen from obliquely above or below as shown in FIG. 14. In order to form an exit region obliquely above or below, it is necessary to impart directivity to the reflective surface of the reflective plate such that reflected light is collected onto the effective field of view areas III.

Techniques for tilting the reflective surface of a reflective plate to impart reflectivity to the reflected light have been known. These related art techniques shift light reflected to the region IV to the regions I that the reflected light does not reach at all, and are not intended to collect the reflected light onto the effective field of view areas III. In consequence, the efficiency of utilization of light is not improved.

SUMMARY OF INVENTION

In view of the foregoing situations, it is an object of the present invention to provide a reflective plate which can be used in a reflective LCD screen and form reflected light-exiting regions in the effective field of view areas obliquely above or below the reflective plate.

It is another object of the invention to provide a reflective liquid crystal display using this reflective plate.

It is a further object of the invention to provide electronic apparatus equipped with a reflective liquid crystal display having the reflective plate described above.

It is a yet other object of the invention to provide a method of reflecting light using the reflective plate described above.

A reflective plate according to the present invention has a plurality of reflective subregions each of which has at least one reflective surface for reflecting light. The light reflected from these reflective subregions form spreads of exit. These spreads of exit intersect each other at a given upper position to thereby form a common exit region. This reflective plate is characterized in that the reflective subregions are so arranged that light rays incident on the reflective plate from a vertical direction are reflected substantially toward the center of the exit region located outside a region lying vertically above the reflective plate, and that the centers of intensities of the reflected light rays concentrate at the center of the exit region.

The reflective subregions (or reflective unit regions) referred to herein are partitioned from each other by concave or convex portions and are regions that reflect incident light.

Each reflective subregion may be one of reflective sections partitioned from each other by concave or convex portions or an assemblage of such reflective sections. If each reflective subregion is partitioned from other subregions by concave portions, the inside is inevitably convex. This convex portion is a flat plane tilted to one side and having a uniform angle of reflection, a convex spherical plane, or convex aspherical plane. If each reflective subregion is partitioned from other subregions by convex portions, the inside is inevitably concave. This concave portion is a flat plane tilted to one side and having a uniform angle of reflection, a concave spherical plane, or concave aspherical plane.

The reflective surface of the interior partitioned from others by the concave or convex portions is not limited to a flat plane having a uniform angle of reflection. The height of the plane increases or decreases monotonously. A minute convex or concave portion may be formed at an intermediate height of the plane. The aforementioned concave or convex spherical plane or aspherical plane may vary continuously in curvature. Alternatively, a minute convex or concave portion may be formed in its intermediate position.

That "are reflected substantially toward the center of the exit region" means that this reflective plate is applied to a liquid crystal display and that a person who observes this liquid crystal display is in a viewable range with a tolerable viewable range of about ±30°.

That "light rays concentrate at the center of the exit region" means that "it is desirable that the light rays are concentrated at one point but slight variations are permissible. For example, where the center of an ideal exit region is taken as a virtual center, the same effect is produced if the center of intensity of reflected light is within the angular spread of about ±30° described above about the virtual center, and the light rays are concentrated at the center of the exit region."

According to the present invention, a reflective plate has plural reflective subregions each having at least one reflective surface that reflects light. Light reflected from the reflective subregions form spreads of exit which intersect each other at a given upper position and together form a common exit region. Therefore, the reflected light can be guided and concentrated to the given upper position. Light incident on the reflective plate from a vertical direction is reflected by the reflective subregions substantially toward the center of the exit region lying outside a region that is located vertically above the reflective plate. The reflective subregions are so arranged that the centers of the reflected light rays concentrate at the center of the exit region. Therefore, where this reflective plate is applied to a liquid crystal display, a brighter liquid crystal display can be observed at the common exit region owing to the concentrated light rays.

With respect to the reflective subregions, the shape of the reflective surface is preferably made different according to the installation position. This technical means makes it possible to set the direction of the reflective surface at will. Reflected light can be concentrated in a desired direction.

Preferably, the reflective subregions are so arranged that the angle formed between the light incident on the reflective subregions and the reflected light arising from the incident light decreases in going toward the center of the exit region. According to this technical means, by reducing the angle formed between the light incident on each reflective subregion and the reflected light arising from the incident light as the reflective subregion comes closer to the center of the common exit region, the center of intensity of the exit region can be concentrated at the exit region. Consequently, the common exit region can be made brighter.

The surfaces of the reflective subregions that face the exit region preferably have plural curved surfaces. This technical means permits one to set the direction of reflective surfaces at will. This can prevent variations in brightness as viewed from the direction of reflection. Hence, the directivity can be enhanced. At the same time, brightness variations can be reduced.

The aforementioned plural reflective subregions are preferably arranged coaxially from the point (hereinafter referred to as the projection point) obtained by projecting the center of the exit region onto a plane including the reflective plate. Normal lines to the tilted surfaces of the reflective subregions are preferably tilted toward the projection point. The normal lines preferably have the same tilt angle on the same coaxial circle.

The "plane including the reflective plate" means a virtual plane extending outward from the end of the reflective plate. The plane may be a virtual plane extending from a reflective film forming the reflective plate. Also, the virtual plane may extend from that position vertically beyond the cross-sectional thickness of the reflective plate.

Because of this technical means, the reflective subregions arranged coaxially from the projection point of the center of the exit regions are so disposed that their reflective surfaces having the same tilt angle are directed toward the projection point. Therefore, the centers of intensities of their respective exit regions can be concentrated at the center of the exit region. In consequence, the common exit region can be made brighter.

The center of the exit region is preferably present within a virtual plane extending normal to the surface of the reflective plate on a substantially bisector line of the reflective plate. Because of this technical means, the centers of intensities of their respective exit regions concentrated at the center of the exit region are placed at the substantially bisector line of the reflective plate and so when this is applied to a liquid crystal display, symmetrical right and left positions can be displayed brightly.

A liquid crystal display according to the present invention has first and second substrates disposed opposite to each other, a liquid-crystal layer consisting of a liquid crystal sealed in between the first and second substrates, and a reflective layer having a plurality of reflective subregions each of which has at least one reflective surface formed on the second substrate for reflecting light. The liquid crystal display has the following features. First incident light incident from a given direction on the surface of the first substrate that faces away from the liquid-crystal layer is divided into at least first reflected light and second incident light. The first reflected light is produced by regular reflection at the surface of the first substrate. The second incident light reaches the reflective subregions via the first substrate and liquid-crystal layer. The second incident light is reflected from the reflective subregions, forming second reflected light which forms plural spreads of exit. These spreads of exit intersect each other at a given position above the first substrate, thus forming a common exit region. The second reflected light is reflected substantially toward the center of the exit region. The centers of intensities of reflected light rays concentrate at the center of the exit region. The reflective subregions are so arranged that the center of the exit region is formed in a given position not in the direction of travel of the first reflected light.

As a first feature of the invention, plural spreads of exit formed by the second reflected light reflected from the reflective subregions intersect each other at the given position above the first substrate and form the common exit region. The second reflected light is reflected substantially toward the center of the exit region. The centers of the intensities of the reflected light rays concentrate at the center of the exit region. Because of this first feature, the centers of intensities of their respective exit regions can be concentrated at the center of the exit region. Consequently, the common exit region can be made brighter.

As a second feature of the invention, the reflective subregions are so arranged that the center of the exit region is formed in a given position not in the direction of travel of the first reflected light. This first reflected light is created as the first incident light incident on the surface of the first substrate facing away from the liquid-crystal layer from a given direction and is reflected regularly from the surface of the first substrate. Because of this feature, the first reflected light and the second reflected light forming the exit region are not emitted in the same direction. Therefore, the image owing to the liquid crystal display is not superimposed on the first reflected light when viewed by a person. Consequently, the liquid crystal display can be viewed well.

The center of the exit region is preferably present within a virtual plane extending normal to the surface of the second substrate on the substantially bisector line of the second substrate. Because of this technical means, the centers of intensities of their respective exit regions concentrated at the center of the exit region are placed on the substantially bisector line of the LCD screen. Therefore, symmetrical right and left positions on the screen can be displayed brightly.

Electronic apparatus according to the present invention is equipped with a liquid crystal display having a reflective plate. This apparatus has a display portion including the liquid crystal display comprising first and second substrates disposed opposite to each other, a liquid-crystal layer consisting of a liquid crystal sealed in between the first and second substrates, and a reflective layer formed on the second substrate. The reflective layer has plural reflective subregions each having at least one reflective surface for reflecting light. The liquid crystal display has the following features. First incident light incident from a given direction on the surface of the first substrate that faces away from liquid-crystal layer is divided into at least first reflected light and second incident light. The first reflected light is produced by regular reflection at the surface of the first substrate. The second incident light reaches the reflective subregions via the first substrate and liquid-crystal layer. The second incident light is reflected from the reflective subregions, forming second reflected light which forms plural spreads of exit. These spreads of exit intersect each other at a given position above the first substrate, thus forming a common exit region. The second reflected light is reflected substantially toward the center of the exit region. The centers of intensities of the reflected light rays concentrate at the center of the exit region. The reflective subregions are so arranged that the center of the exit region is formed in a given position not in the direction of travel of the first reflected light.

The present invention is characterized in that the display portion of the electronic apparatus is constructed from the liquid crystal display described above. Therefore, in the display portion, plural spreads of exit formed by the second reflected light reflected from the reflective subregions intersect each other at the given position above the first substrate and form a common exit region. The second reflected light is reflected substantially toward the center of the exit region. The centers of the intensities of the reflected light rays concentrate at the center of the exit region. Because of this first feature, the centers of intensities of their respective exit regions can be concentrated at the center of the exit region. In consequence, the common exit region can be made brighter.

As a second feature of the display portion described above, the reflective subregions are so arranged that the center of the exit region is formed in a given position not in the direction of travel of the first reflected light. This first reflected light is created as the first incident light incident on the surface of the first substrate facing away from the liquid-crystal layer from a given direction and is reflected regularly from the surface of the first substrate. Because of this feature, the first reflected light and the second reflected light forming the exit region are not emitted in the same direction. Therefore, the image owing to the liquid crystal display is not superimposed on the first reflected light when viewed by a person. Consequently, the liquid crystal display can be viewed well.

A method of reflecting light by a reflective plate in accordance with the present invention is implemented with the reflective plate having plural reflective subregions each having at least one reflective surface for reflecting light. Light reflected from the reflective subregions form plural spreads of exit which intersect each other at a given upper position to thereby form a common exit region. This method is characterized as follows. The light is made to enter the reflective plate from a vertical direction. The incident light is reflected by the plural reflective subregions. The light rays reflected by the reflective subregions are directed substantially toward the center of the exit region located outside a region located vertically above the reflective plate. The centers of intensities of the reflected light rays are concentrated at the center of the exit region. Where this method of reflecting light is applied to a liquid crystal display, the liquid crystal display can be observed brightly in the common region by the concentrated light rays.

BRIEF DESCRIPTION OF DRAWINGS

FIGS. 15A and 5B are diagrams illustrating the state in which a reflective liquid crystal display is used;

DETAILED DESCRIPTION

Preferred embodiments of the present invention are hereinafter described by way of examples with reference to the drawings. It is to be understood, however, the dimensions, materials, and their relative arrangement are not intended to restrict the scope of the invention unless otherwise specifically stated but rather they are merely exemplary.

Figure 1:
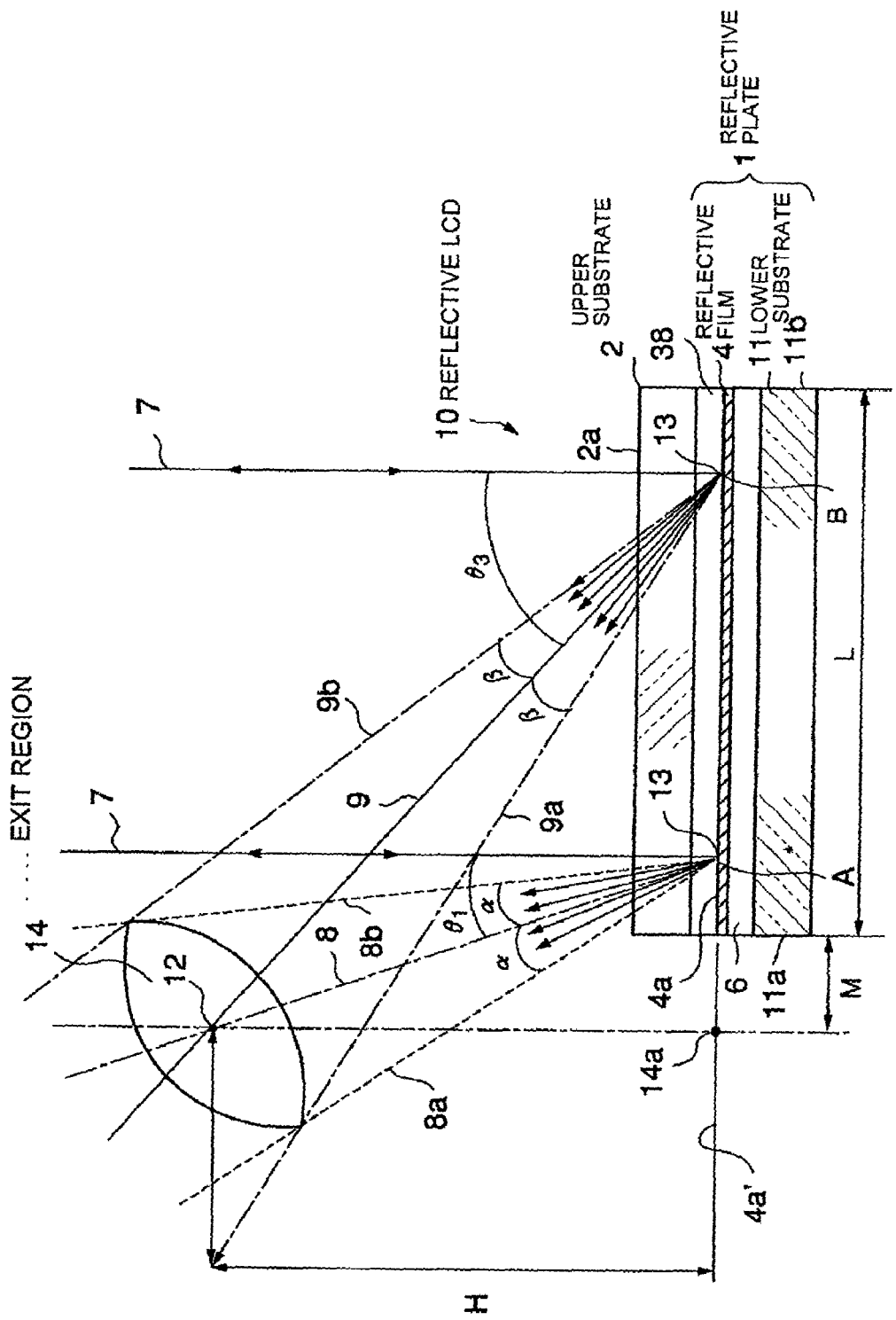
FIG. 1 is a cross-sectional view illustrating main portions of a reflective plate according to an embodiment of the present invention.
Figure 2:
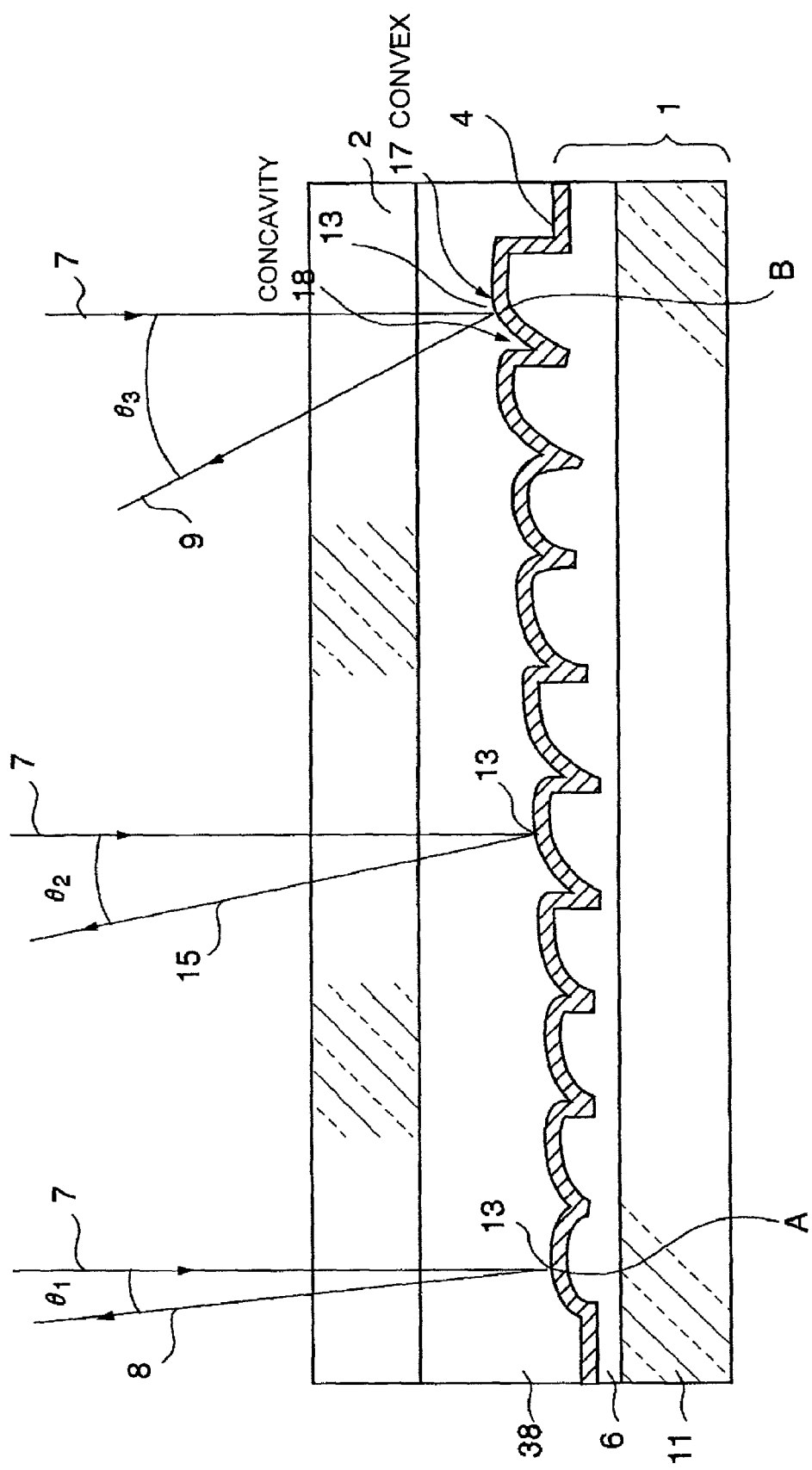
FIG. 2 is a view illustrating an enlarged cross-sectional shape of the reflective film of FIG. 1.
Figure 3A:
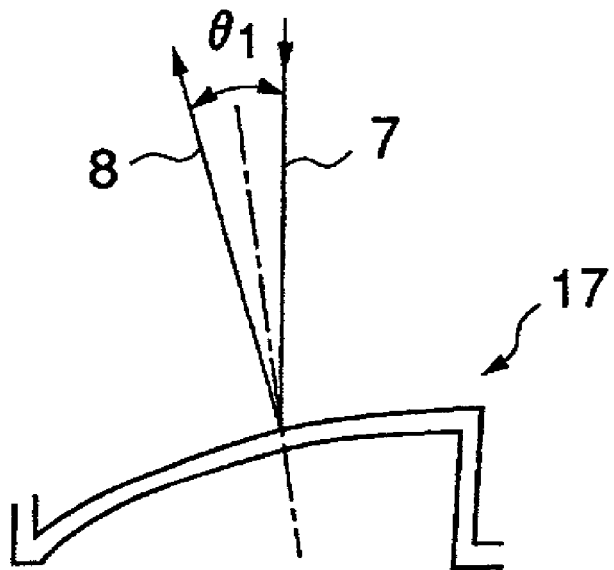
FIGS. 3A and 3B are cross-sectional views illustrating plane geometries of convex portions on reflective films.
Figure 3B:
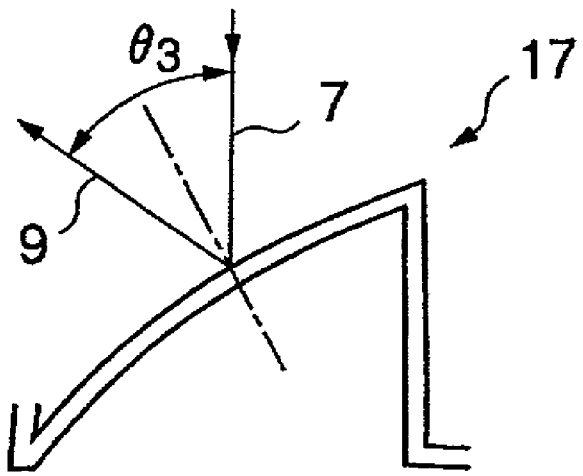
Figure 4:
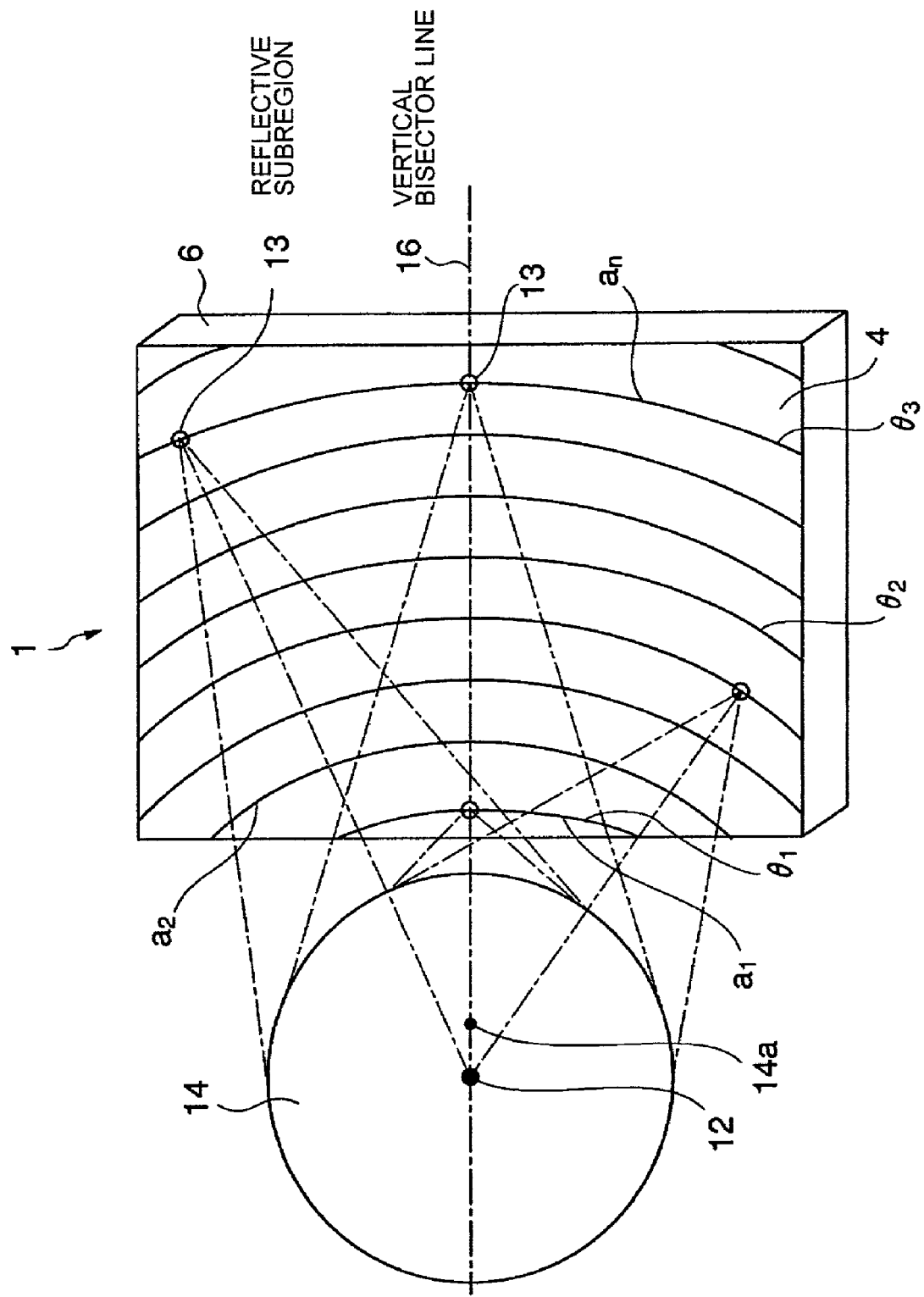
FIG. 4 is a plan view of a reflective plate according to a first embodiment.

FIG. 1 is a cross-sectional view illustrating main portions of a reflective plate according to an embodiment of the present invention. FIG. 2 is a view illustrating an enlarged cross-sectional shape of the reflective film of FIG. 1. FIG. 3 is a cross-sectional view illustrating plane geometries of convex portions on reflective films. FIG. 4 is a plan view of a reflective plate according to a first embodiment.

A reflective liquid crystal display 10 composed of an upper substrate 2, a liquid-crystal layer 38, and a reflective plate 1 is shown in cross section. The reflective plate 1 consists of an opaque or transparent lower substrate 11, together with a resinous layer 6 and a reflective film 4 formed on the lower plate 11. The lower plate is made of ceramic, glass, plastic, or the like. Note that FIG. 1 is a schematic view and is not drawn, taking account of the differences between the refractive indices of various layers such as the liquid-crystal layer 38 and the upper substrate 2. The reflective film 4 is shown to be planar. However, convex portions 17 having reflective tilted surfaces (described later) are formed on its upper surface 4a.

Incident light 7 entering through the upper substrate 2 is partially reflected by the surface 2a of the upper substrate 2 and returns. The light entering the upper substrate 2 reaches reflective subregions 13 which are so arranged that the angle θ between the incident light and the reflected light varies in going from region A to region B. In the region A, the incident light 7 reflects at an angle of $θ_1$. In the region B, the incident light 7 reflects at an angle of $θ_3$.

Reflected light 8 forms a substantially circular exit region 14 spreading as reflected light rays 8a and 8b within an angular range of α. Also, reflected light 9 forms the substantially circular exit region 14 spreading as reflected light rays 9a and 9b within an angular range of β. The center 12 of this exit region 14 is formed on a normal line at a distance of M from the end of the reflective liquid crystal display 10. With respect to the position of this center 12, where the horizontal length L of the reflective liquid crystal display 10 as viewed on FIG. 1 is set to 40 mm, the distance M from the edge 11a is set to 10 mm, a projection point 14a of the center 12 is placed on a virtual extension plane 4a' of the upper surface 4a of the reflective film 4 and immediately below the center 12, and the distance H from the projection point 14a to the center 12 is set to 300 mm, desirable results are obtained.

As shown in FIG. 2, the shape of the convex portions 17 on the reflective film 4 is so set that the angle θ between the incident light and the reflected light 8, 15, or 9 increases in going from the region A to the region B. For this purpose, the angle of reflection at the reflective subregions 13 is varied such that the angle θ is obtained between the incident light and the reflected light for light rays 7 incident normal to the surface of the upper substrate 2 as shown in FIG. 3.

FIG. 4 is a plan view of a reflective plate according to a first embodiment. The reflective subregions 13 on the reflective plate 1 are regularly spaced from each other on the center line (vertical bisector line) 16. Also, the subregions are arranged on coaxial circles $a_1, \ldots, a_n$, (where n is an integer greater than unity) centered at the center point 14a placed on the center line. The reflective subregions having the same angle between the incident light and the reflected light are positioned on the same coaxial line. A multiplicity of reflective subregions having different angles of $θ_1$, $θ_2$, and $θ_3$ from the left side are placed.

The reflective subregions 13 on the coaxial circles reflect light incident from a direction vertical to the plane of the paper of FIG. 4 and form the exit region 14. All the reflective subregions 13 are so arranged that the reflected light rays are concentrated at the center 12 of the exit region 14.

Since the device is so constructed in the first embodiment in this way, light can be concentrated at the side of the center of the exit region. The adjacent reflective subregions overlap each other. The liquid crystal image can be backlit. A brighter screen can be viewed on the side of the center of the exit region.

Figure 5A:
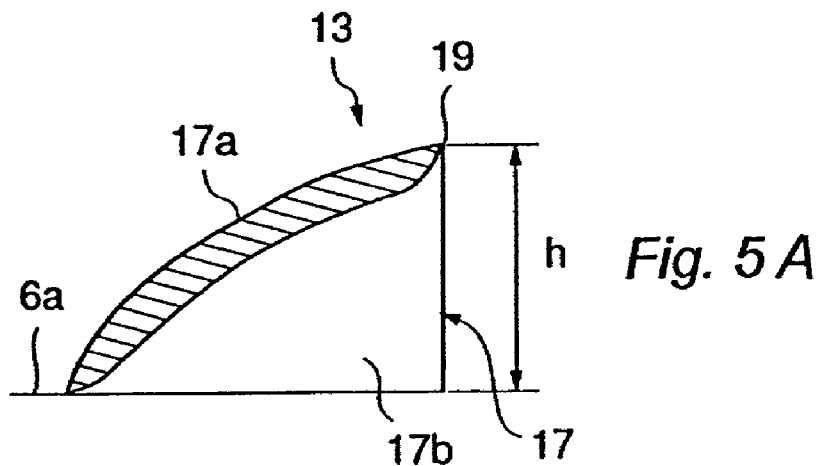
FIGS. 5A, 5B and 5C are diagrams illustrating the arrangement of convex portions on a reflective film.
Figure 5B:
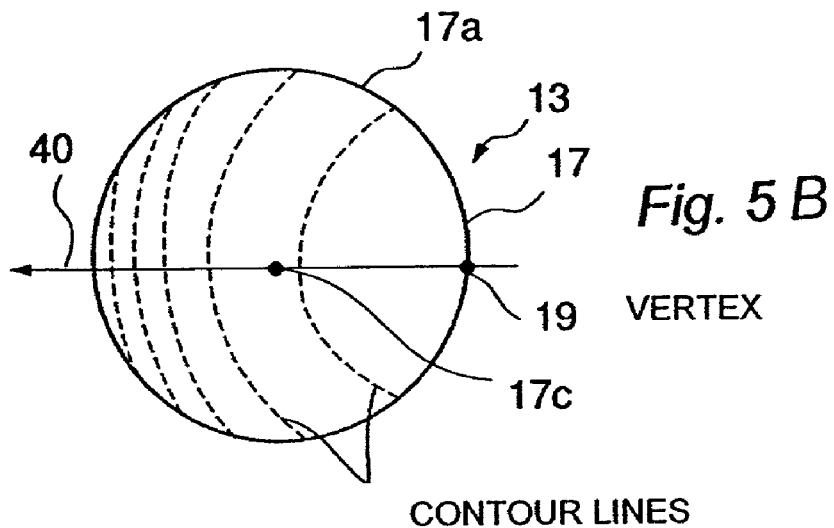

Details of the structure of the reflective subregions 13 used in the present embodiment are next described by referring to FIG. 5.

The reflective subregion 13 shown here is formed by cutting a cylindrical elevated, convex portion 17 obliquely and curving the cut surface as a surface 17a.

The subregion is designed such that the vertex 19 of the surface 17a and the shape of the surface 17a that is a curved surface are matched to the target exit region. This surface 17a does not have any vertical plane (tangential plane) for light incident from a direction vertical to the reflective subregion 13. The front end is sharp. Therefore, light reflected from the surface 17a is little reflected to the right side of the reflective plate 1 shown in FIG. 4.

It is necessary that the reflective subregions 13 at different positions on the reflective plate 1 reflect light to the common exit region 14. Therefore, the direction in which the surface 17a faces the exit region differs slightly at each different position of the reflective subregions 13.

Figure 5C:
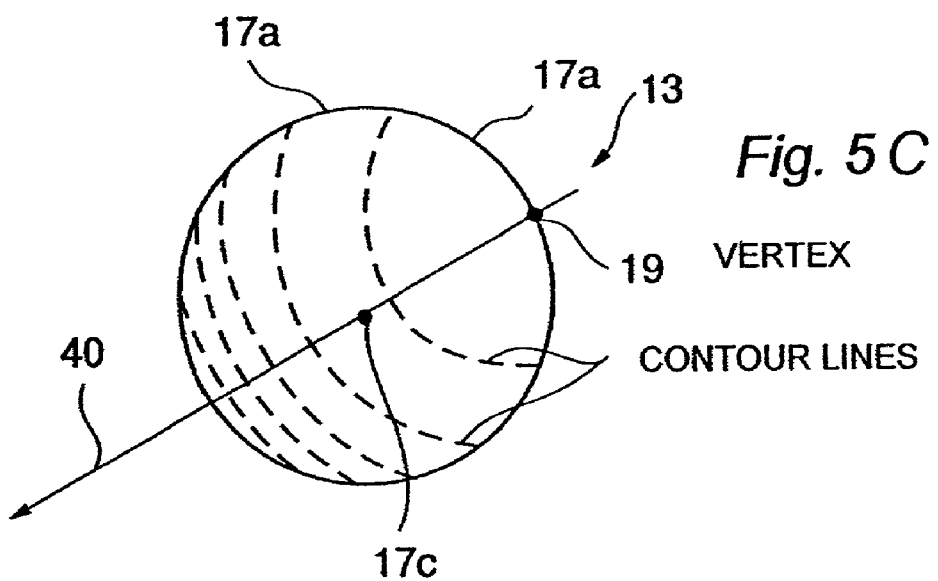

Specifically, on each reflective subregion 13 lying on the vertical bisector line 16, the straight line 40 connecting the vertex 19 and the center 17c is coincident with the vertical bisector line 16. On the other reflective subregions 13, the straight line 40 described above is coincident with the direction of the center 14a of the exit region 14, as shown in FIG. 5C.

In the present embodiment, the specific structure of each reflective subregion 13 is fabricated by cutting a cylindrical, elevated convex portion 17 obliquely and curving the cut surface as the surface 17a. The structure is not limited to this. It may also be a triangular prism, quadrangular prism, or polygonal prism. Furthermore, plural convex or concave surfaces may be formed on the cut surface. In addition, each reflective subregion 13 may be formed by appropriately combining plural prismatic convex portions.

Other surface shapes of the convex portions of the reflective film are next described by referring to FIG. 6.

In the first embodiment, light is reflected to the side of the exit region 14 by varying the height of the surface 17. With respect to these convex portions of the reflective film, plural reflective subregions 13 having a reflective surface formed at a given angle are prepared. The angles of the reflective surfaces of the reflective subregions to a given position are made different from each other. The reflective subregions are arrayed from the exit side to reflect light toward the exit region 14.

As shown in FIG. 6, each reflective subregion 13 has a reflective surface 20. Minute wedge-like convex portions 27b–27d having the reflective surface 20 are substantially right triangles in cross section. Their surfaces are curved.

Figure 6A:
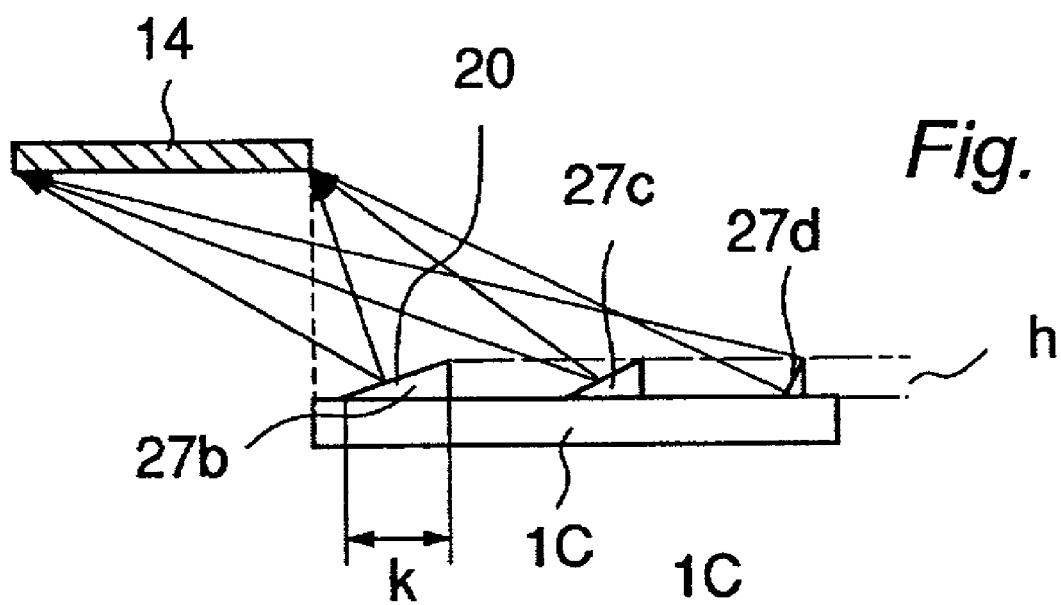
FIGS. 6A and 6B are diagrams illustrating other plane geometry of convex portions of a reflective film.
Figure 6B:
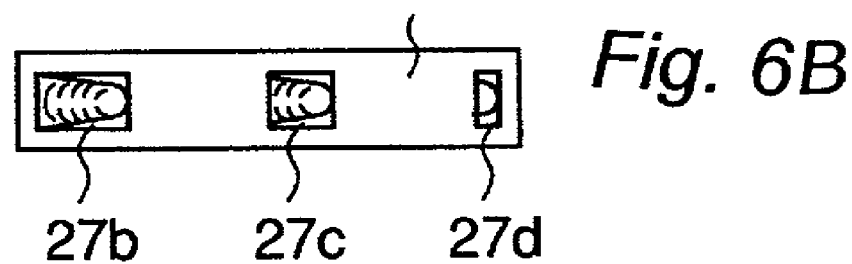

In order to collect light into the given exit region 14 by the wedge-like convex portions 27b–27d, it is necessary to vary the tilt of the surface according to the position of each convex portion 27. For this purpose, the heights h of the convex portions 27b–27d are made uniform, while the lengths k (pitch between the convex portions 27) are varied as shown in FIGS. 6A and 6B.

It is not necessary that the exit region 14 be within a plane parallel to the reflective plate 1C. The exit region may be tilted relative to the surface of the reflective plate 1C.

Figure 7:
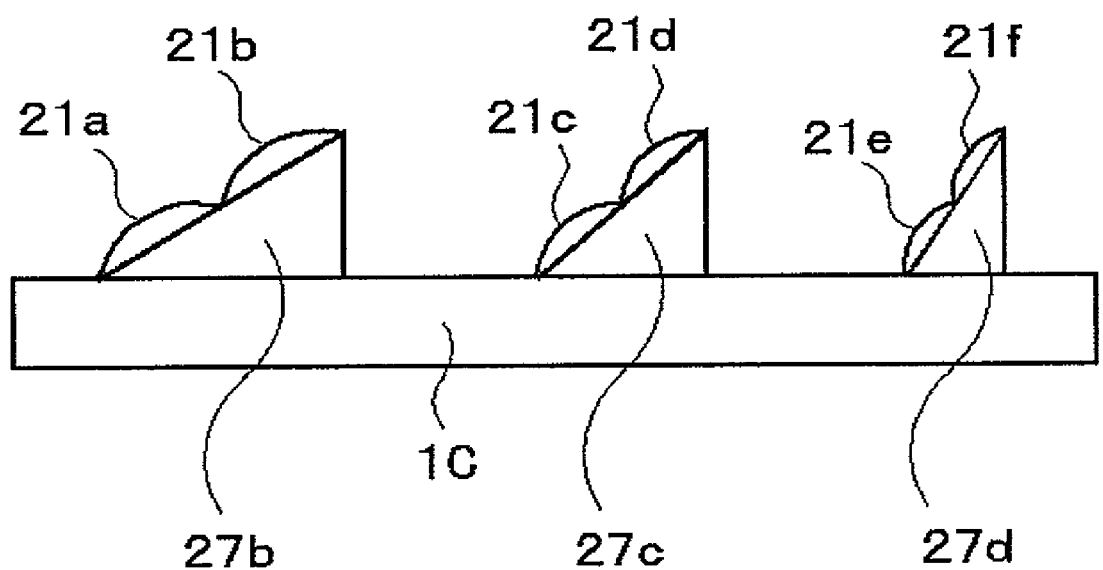
FIG. 7 is a diagram illustrating a still other plane geometry of convex portions of a reflective film.

Furthermore, the reflective surface 20 is curved toward the convex portions. The reflective surface may be planar. In addition, it may be a concave surface.

Where the reflective surface 20 is curved, plural curved surfaces 21a–21f may be formed as shown in FIG. 7. The formation of plural curved surfaces makes it possible to set the direction of the reflective surface at will. Consequently, variations in brightness within the plane of the reflective surface can be prevented. Brightness variations of reflected light can be reduced while enhancing the directivity.

A method of determining the surface 17a of each convex portion 17 on the reflective subregion 13 is next described.

Figure 8A:
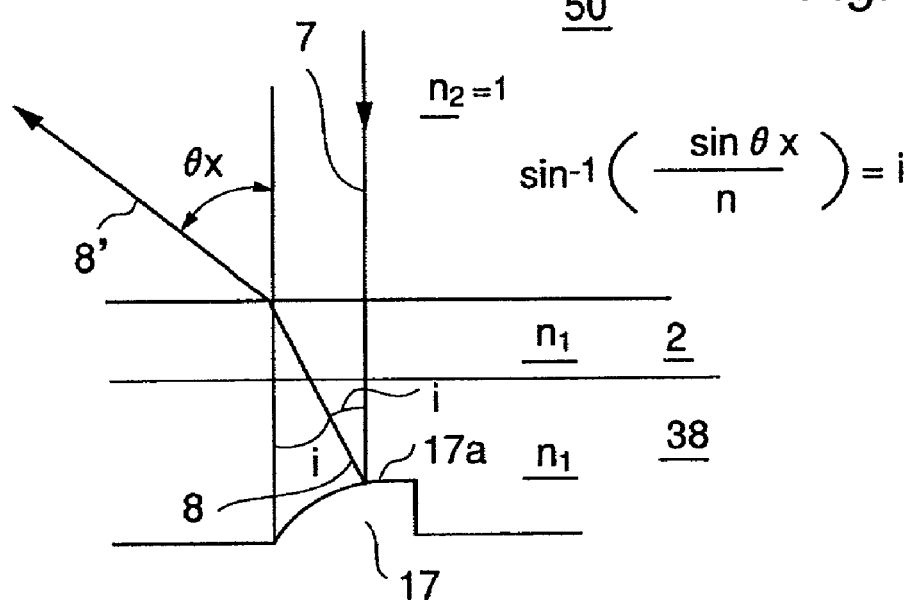
FIGS. 8A and 8B are diagrams illustrating a method of designing a reflective plate.

In FIG. 8A, it is assumed that the refractive index $n_1$ of the liquid-crystal layer 38 is equal to that of the upper substrate 2. Where incident light 7 vertically enters the upper substrate 2 from an air layer 50, light 8 reflected by the reflective surface 17a refracts as refracted light 8' at the interface between the upper substrate 2 and the air layer 50.

Let us assume that the air layer 50 has a refractive index $n_2=1$ and the liquid-crystal layer 38 has a refractive index $n_1$. Let i be the angle of incidence. Let $\theta_x$ be the angle of refraction. From Snell's law, we have $$\frac{\sin i}{\sin \theta_x} = \frac{1}{n_1} \quad (1)$$

$$\sin i = \frac{\sin \theta_x}{n_1}$$

$$i = \sin^{-1}\left(\frac{\sin \theta_x}{n_1}\right)$$

Figure 8B:
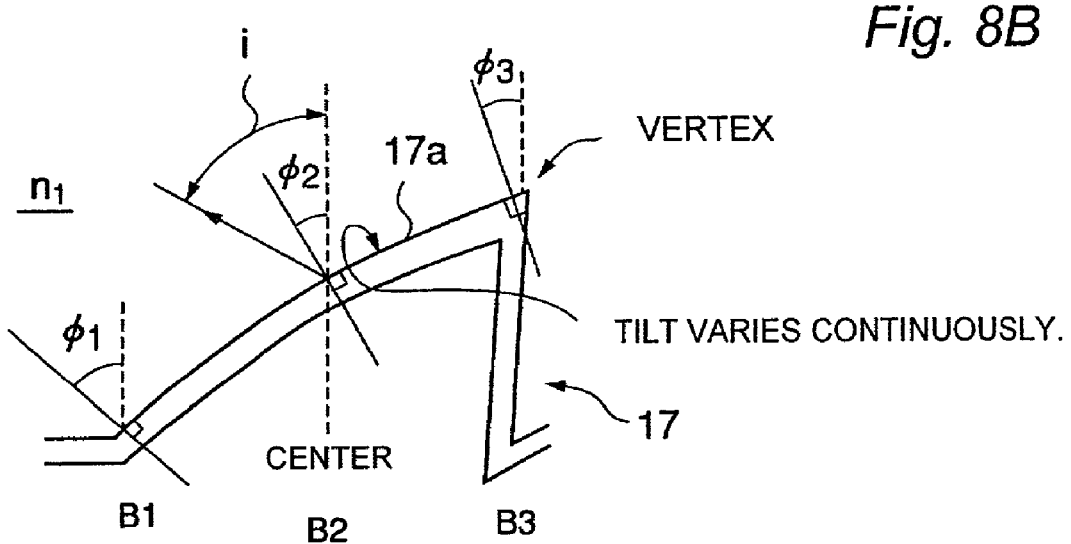

Meanwhile, the angle of reflection $\phi = i/2$ is designed to vary continuously from the position $B_3$ corresponding to the vertex toward a lower position $B_1$, such that $\phi_1 > \phi_2 > \phi_3$ as shown in FIG. 8B. Let $\theta_x$ be the angle of refraction at the air layer 50 corresponding to the center $B_2$. The angle of refraction corresponding to $B_1$ is $\theta_x + \beta$. The angle of refraction corresponding to $B_2$ is $\theta_x$. The angle of refraction corresponding to $B_3$ is $\theta_x - \beta$.

Therefore, the angle of refraction i (equal to the angle of incidence) corresponding to $B_1$ is given by $$\sin^{-1}\left(\frac{\sin(\theta_x + \beta)}{n_1}\right) \quad (2)$$

The angle of refraction i corresponding to $B_2$ is given by $$\sin^{-1}\left(\frac{\sin \theta_x}{n_1}\right) \quad (3)$$

The angle of refraction i corresponding to $B_3$ is given by $$\sin^{-1}\left(\frac{\sin(\theta_x - \beta)}{n_1}\right) \quad (4)$$

The tilt $\phi$, or angle of reflection, is calculated, at $B_1$, to be $$\phi_1 = \left(\frac{1}{2}\right)\sin^{-1}\left\{\frac{\sin(\phi_x + \beta)}{n_1}\right\}$$

The tilt is calculated, at $B_2$, to be $$\phi_2 = \left(\frac{1}{2}\right)\sin^{-1}\left\{\frac{\sin \phi_x}{n_1}\right\}$$

The tilt is calculated, at $B_3$, to be $$\phi_3 = \left(\frac{1}{2}\right)\sin^{-1}\left\{\frac{\sin(\phi_x - \beta)}{n_1}\right\}$$

Figure 9:
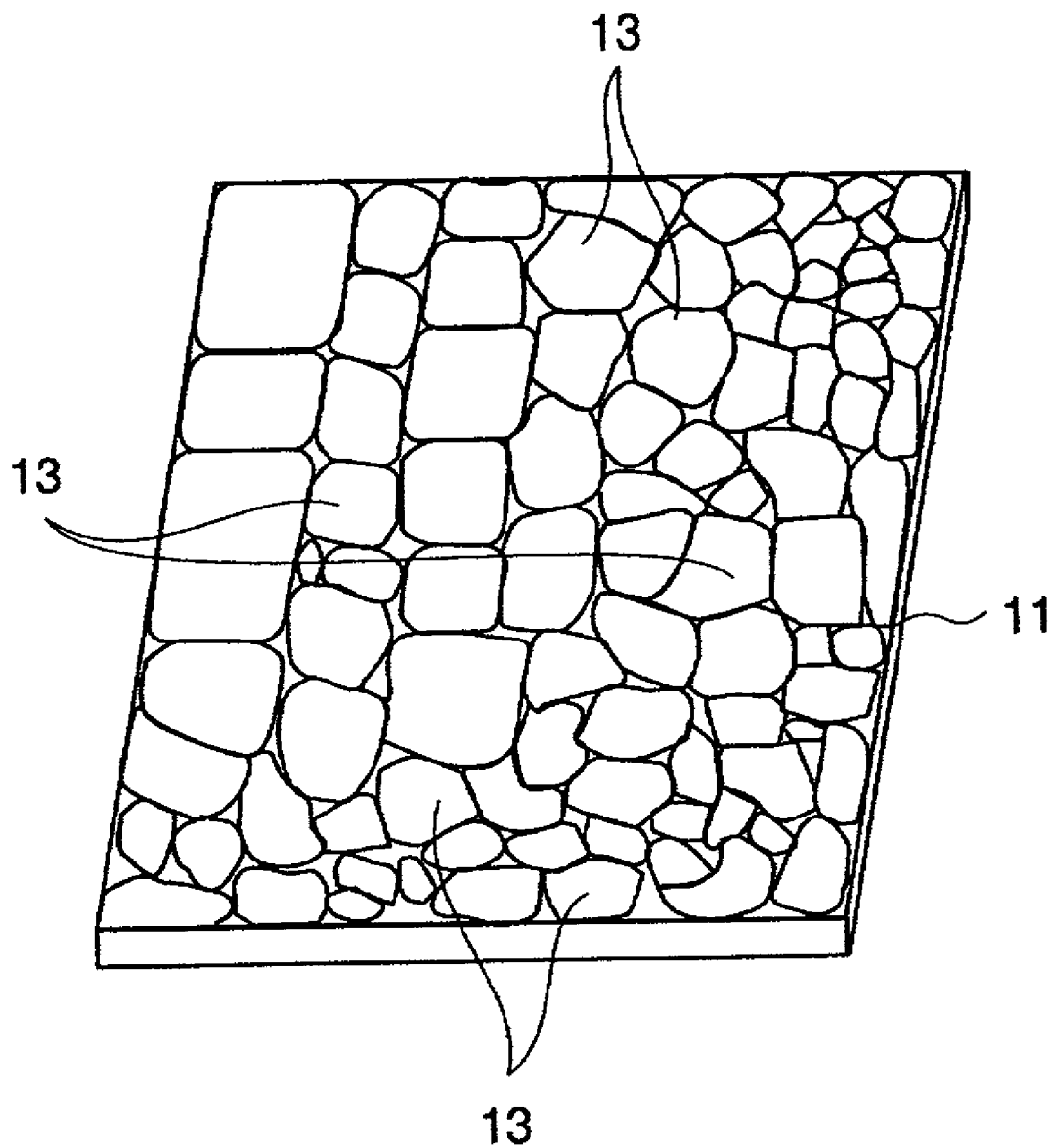
FIG. 9 is a perspective view showing a reflective plate having reflective subregions arranged at random.

The aforementioned reflective subregions 13 are each made up of one or more concavities or convexes 17 and 18. The reflective subregions 13 are essentially regularly or periodically arranged. It is not necessary that their dimensions be uniform. As shown in FIG. 9, they may have random sizes. Furthermore, with respect to their shapes, they may have indeterminate polygonal forms. Therefore, the reflective subregions 13 do not need to be arranged in matrix form. They should be arranged densely in two dimensions, and they form reflective surfaces having almost no flat portions.

A method of fabricating concave or convex forms used on a reflecting plate is next described. The concave or convex forms can be mass-produced with a mold, known as a stamper. A photopolymerization (2P method) replication process that is one method of fabricating it is described by referring to FIGS. 10A–10D.

Figure 10:
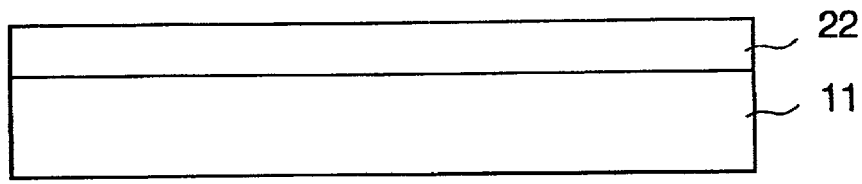
FIGS. 10A to 10D are diagrams illustrating a method of fabricating a stamper.
Figure 10:
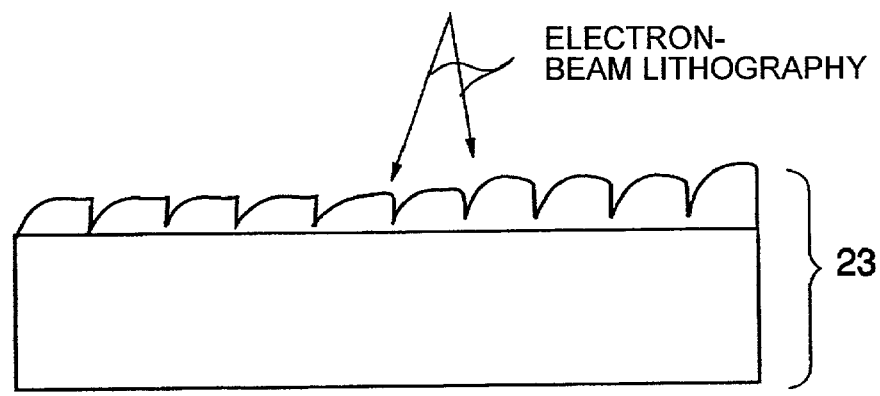
Figure 10:
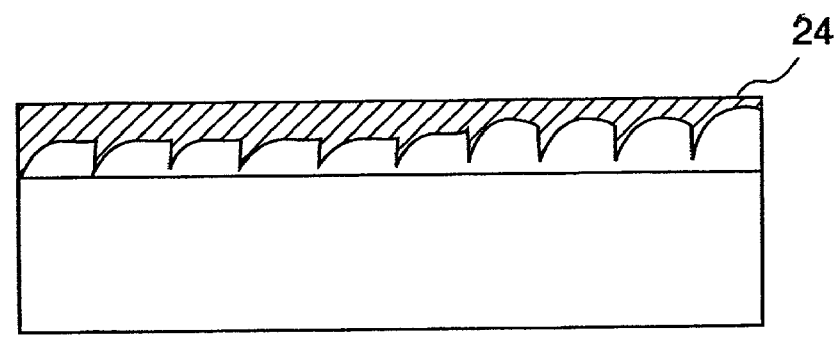
Figure 10:
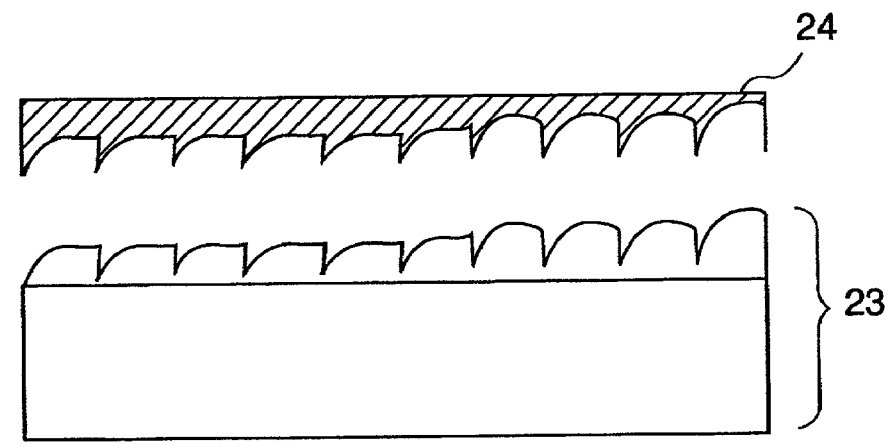

First, as shown in FIG. 10A, the substrate 11 is prepared. An electron-beam resist 22 is applied to it.

Then, as shown in FIG. 10B, the resist 22 is microprocessed by an electron beam to form convexes. Thus, a master 23 for the convexes or concavities is fabricated.

Subsequently, as shown in FIG. 10C, a stamper material such as nickel is deposited on the master 23 by electroforming, thus fabricating a stamper 24.

Thereafter, as shown in FIG. 10D, the stamper 24 and the master 23 are separated. The stamper 24 shows concavities relative to the aforementioned convex form. Thus, a mold having concavities and convexes is produced.

A method of fabricating the aforementioned reflective plate is next described by referring to FIGS. 11A–11D. After fabricating the master 23 that is a prototype of the reflective plate as mentioned previously, the stamper 24 is fabricated by electroplating. A pattern 24a that is an inversion of the surface topography of the reflective plate is formed on the stamper 24.

Figure 11A:
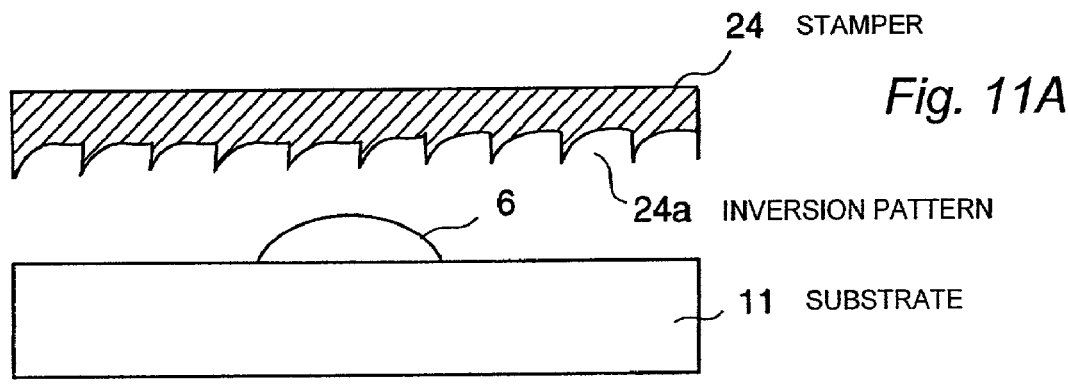
FIGS. 11A to 11D are diagrams illustrating a method of fabricating a reflective plate.

As described in FIG. 11A, a UV-curable resin 6 is dripped onto a transparent substrate 11 made of a glass substrate, transparent resinous film, or the like. Where the stamper transmits UV radiation, the substrate 11 does not need to be transparent. Then, the stamper 24 is lowered onto the substrate 11 from above the UV-curable resin 6. The UV-curable resin 6 is spread between the substrate 11 and stamper 24 to fill the space between the substrate 11 and stamper 24.

Figure 11B:
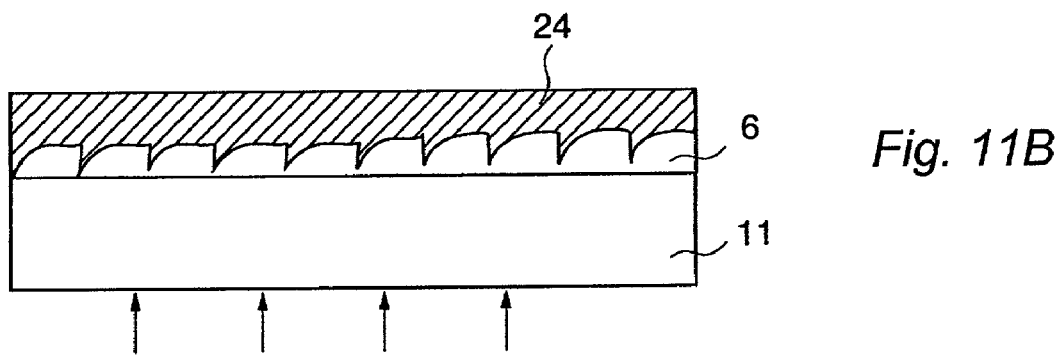
Figure 11C:
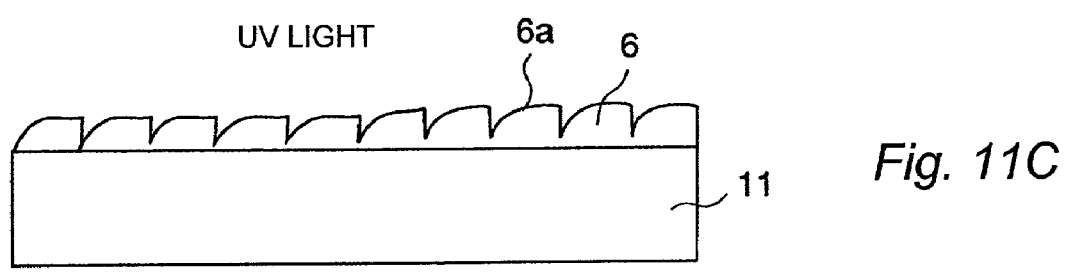

Then, as shown in FIG. 11B, UV radiation is directed at the UV-curable resin 6 from the side of the substrate 11 to cure the UV-curable resin 6 by a photocuring reaction. After the UV-curable resin 6 cures, the stamper 24 is peeled off from the UV-curable resin 6. As a result, a pattern 24a that is an inversion of the stamper 24 is transferred as a pattern 6a to the surface of the UV-curable resin 6, as shown in FIG. 11C.

Figure 11D:
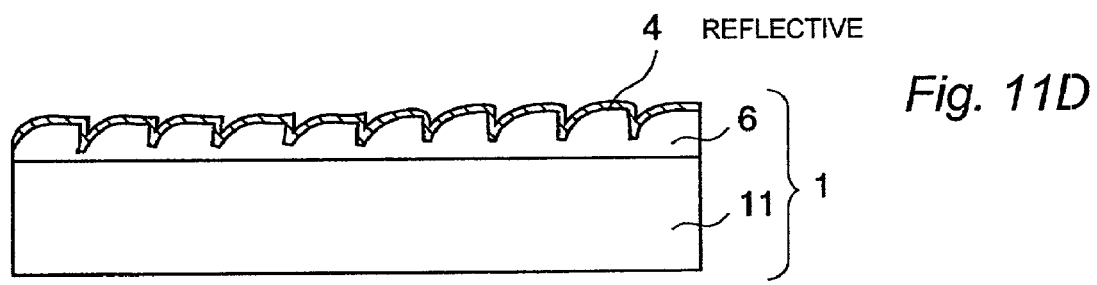

Thereafter, a thin film of a metal such as Ag or Al is deposited by sputtering or other method on the pattern 6a of the UV-curable resin 6. The reflective film 4 is formed as shown in FIG. 11D. Thus, the reflective plate 1 is completed.

Another method of fabricating the reflective plate is next described by referring to FIGS. 12A–12D. As mentioned previously, after forming the master 23 that is a prototype of the reflective plate, the stamper 24 is fabricated by electroforming. The pattern 24a that is an inversion of the surface topography of the reflective plate is formed on the stamper 24.

Figure 12A:
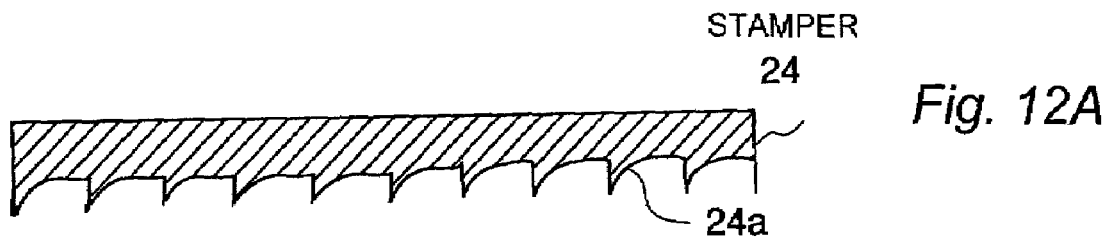
FIGS. 12A to 12D are diagrams illustrating another method of fabricating a reflective plate.
Figure 12B:
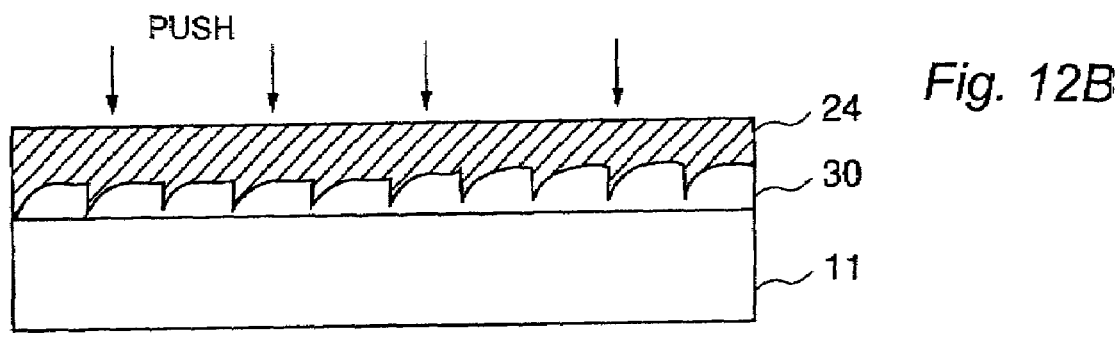
Figure 12C:
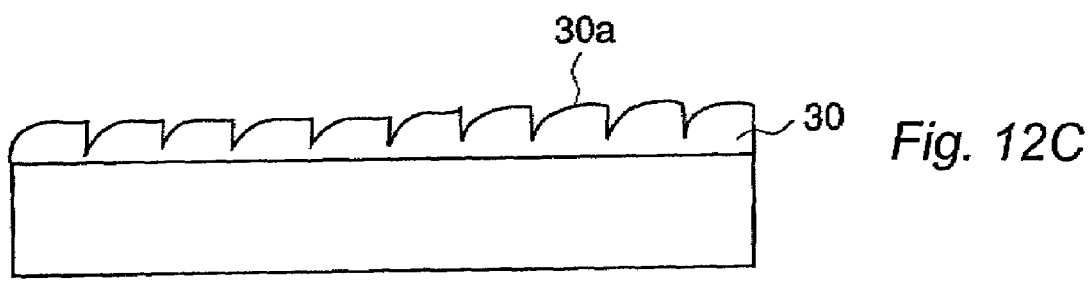

As described in FIG. 12A, a resin 30 such as acrylic is spin-coated on the substrate 11. Then, as described in FIG. 12B, the stamper 24 is lowered from above the resin 30 and pushed against the resin 30. As shown in FIG. 12C, an inversion of the inversion pattern 24a of the stamper 24 is transferred as a pattern 30a to the surface of the resin 30.

Figure 12D:
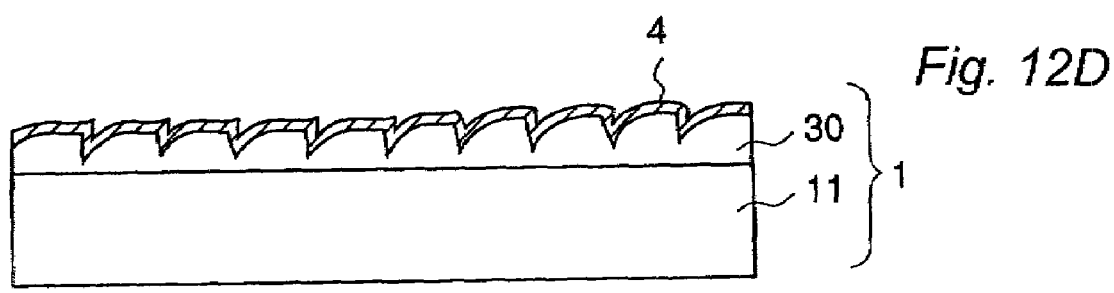

Then, a thin metal film such as Ag or Al is deposited on the pattern 30a of the resin 30 by sputtering. As shown in FIG. 12D, a reflective film 4 is formed. In this way, the reflective plate 1 is completed.

Figure 13:
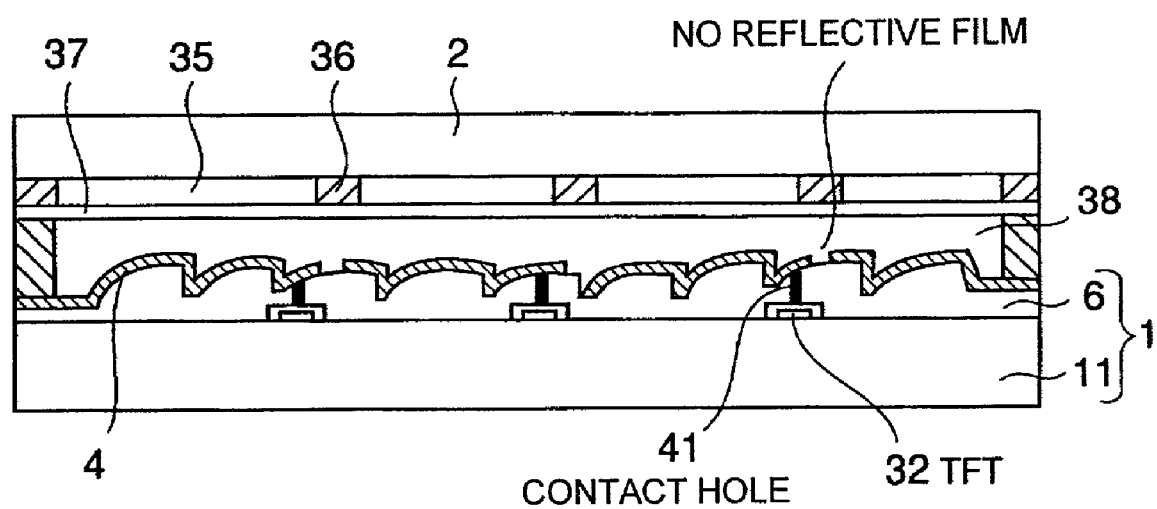
FIG. 13 is a schematic cross-sectional view of a reflective liquid crystal display.

FIG. 13 schematically shows the structure of a reflective liquid crystal display equipped with the reflective plate fabricated as mentioned above. The upper substrate 2 is constructed such that the reflective plate 1 is treated as a rear substrate. In particular, thin-film transistors (TFTs) 32 are fabricated on the surface of the reflective plate 1 prior to process steps shown in FIG. 11, thus forming the lower substrate 11.

Then, a pattern of concavities or convexes is created from a light-sensitive resin on the lower substrate 11 as described previously. Contact holes 41 are formed at positions corresponding to the TFTs 32. A thin metal film is sputtered on the pattern of concavities or convexes and in the contact holes 41. The metal film and the reflective film 4 can together form a conductive path that electrically connects the reflective film 4 and the TFTs 32.

Meanwhile, a black matrix 36, color filters 35, and a transparent (ITO) electrode 37 are formed on the rear surface of the upper substrate 2. A polarizer (not shown) is stuck on the surface of the upper substrate 2, thus forming a front substrate. Then, a liquid-crystal layer 38 is sandwiched between the transparent (ITO) electrode 37 and the reflective plate 4. Thus, a reflective liquid crystal display is completed.

Because of this structure, the LCD panel and reflective plate are integrated and so the reflective liquid crystal display can be thinned.

The application of the reflective plate of the present embodiment is not limited to a reflective liquid crystal display. The reflective plate can also be used for other reflective display devices. Furthermore, the power of the backlight source (not shown) can be reduced. Also, the reflective plate can also be used in a so-called semi-transmissive liquid crystal display that takes in incident light from other than the LCD panel.

A surface reflection type reflective plate has been described in which a pattern of concavities or convexes is formed on the surface of the reflective plate. The incident light is reflected by the surfaces of the concavities or convexes. A reflective plate of a rear surface reflection type may also be used in which a substrate is made of glass or transparent resin. A pattern of concavities or convexes is formed on the rear surface of the substrate to reflect incident light.

Figure 14:
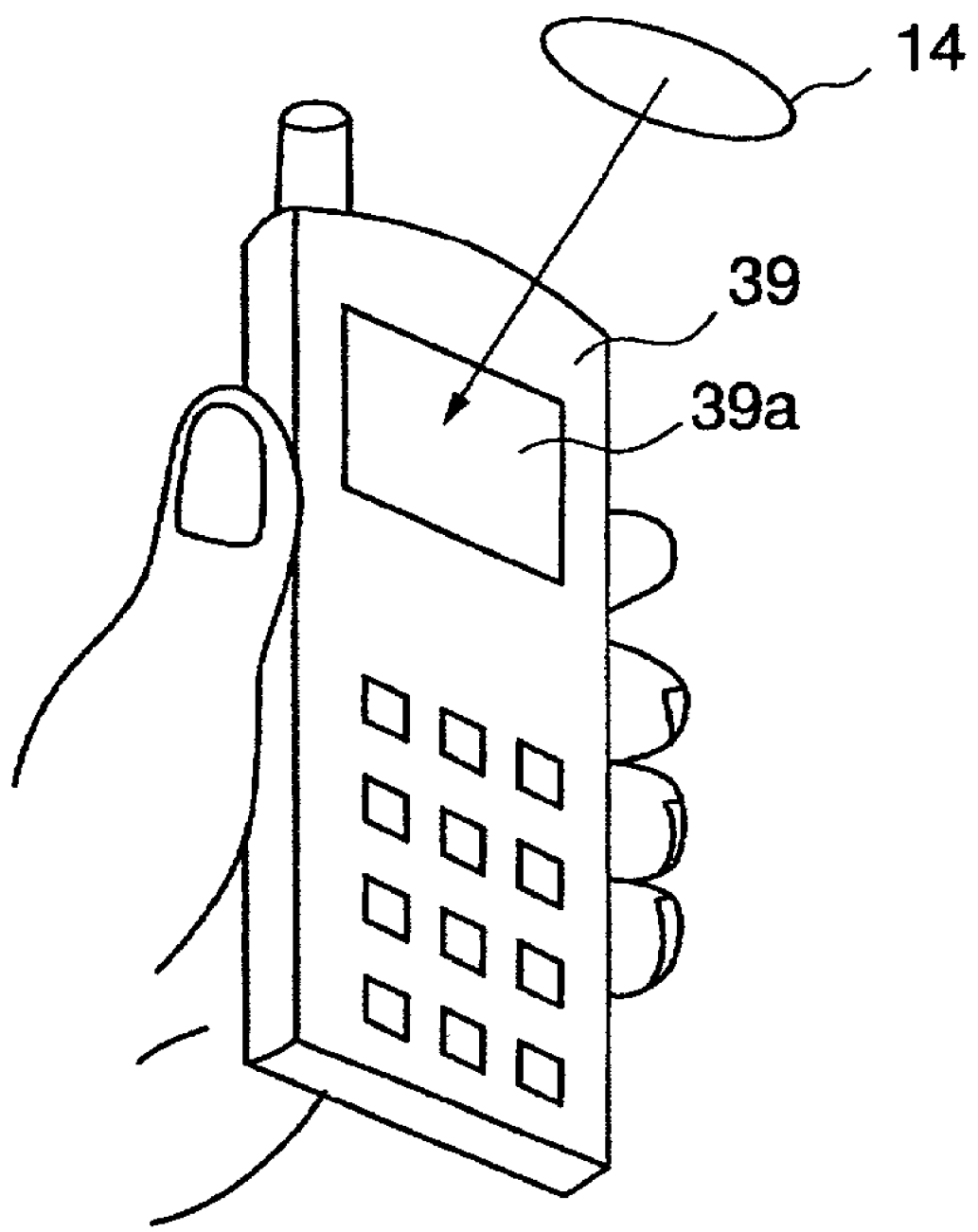
FIG. 14 is a perspective view of a wireless information transmission device.

Referring to FIG. 14, there is shown a wireless information transmission device 39 such as a cellular phone or low-power consumption wireless device using a reflective liquid crystal display as a display that employs the reflective plate of the present embodiment.

The present wireless information transmission device 39 constructed in this way is gripped as shown in FIG. 14. Light is incident normal to the monitor screen 39a. Under this condition, the image on the monitor screen 39a can be observed from the upper exit region 14.

Figure 15A:
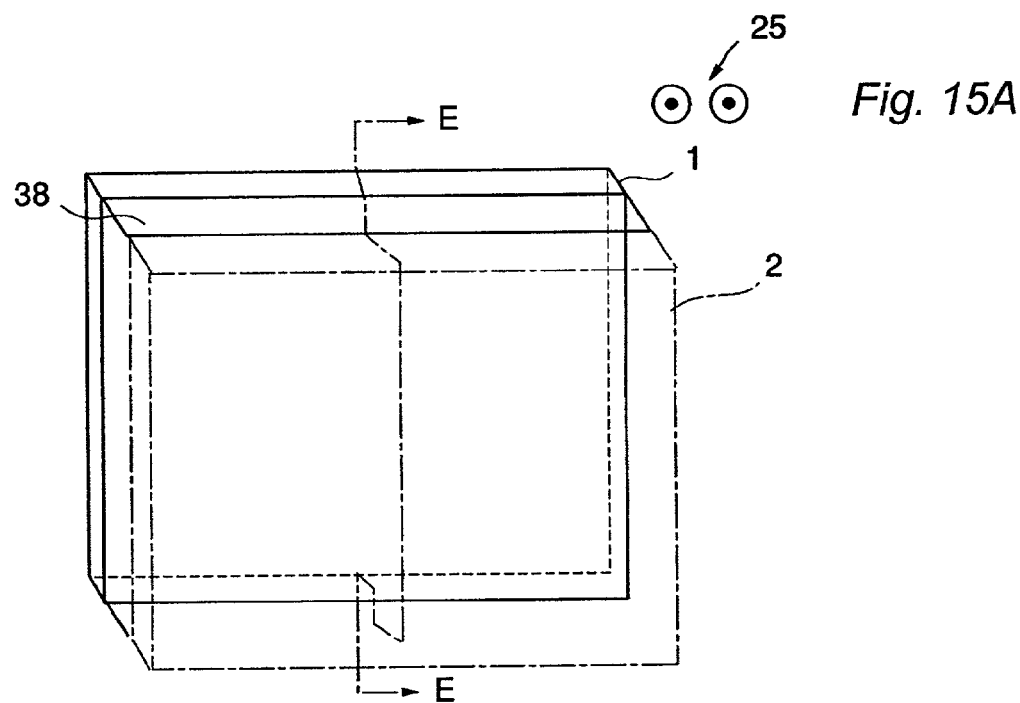
Figure 15B:
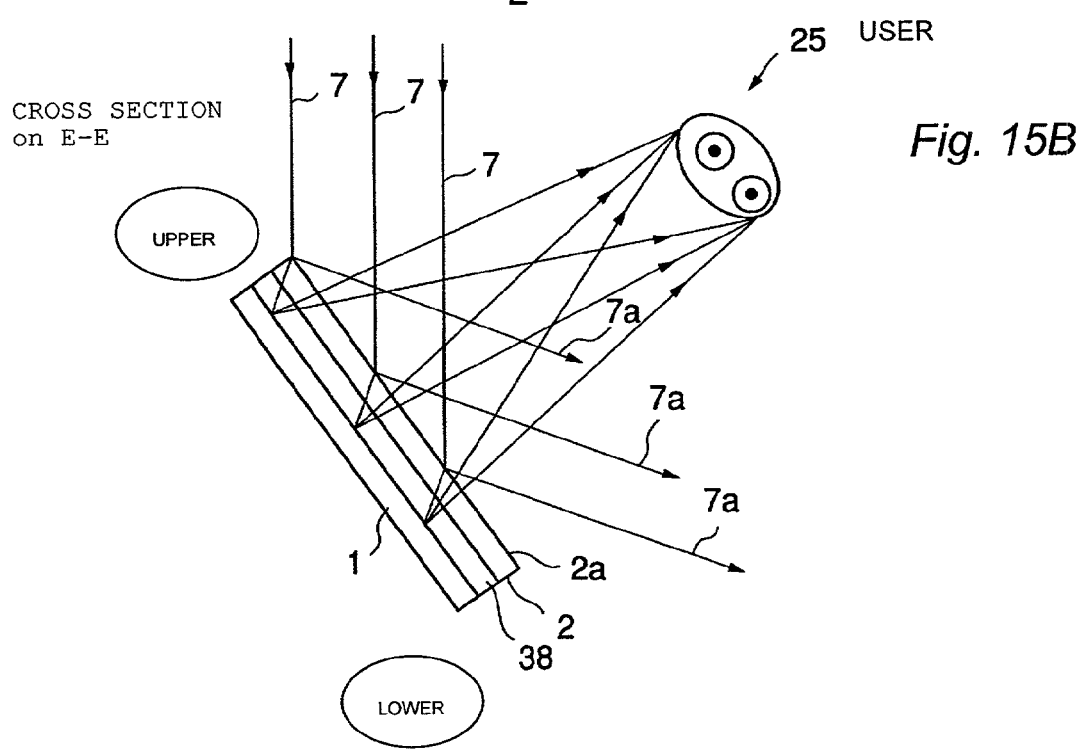
Figure 16A:
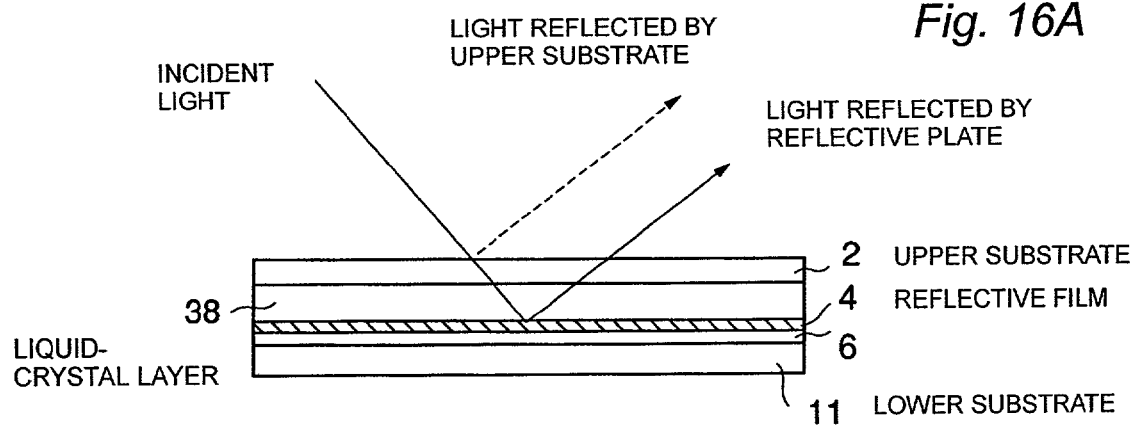
FIGS. 16A to 16C are diagrams illustrating problems with the prior art reflective liquid crystal display.
Figure 16B:
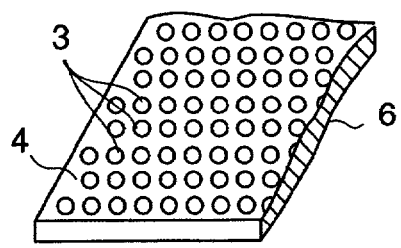
Figure 16C:
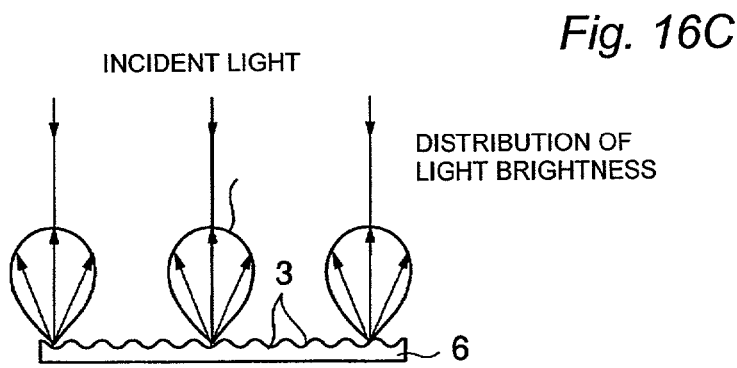
Figure 17A:
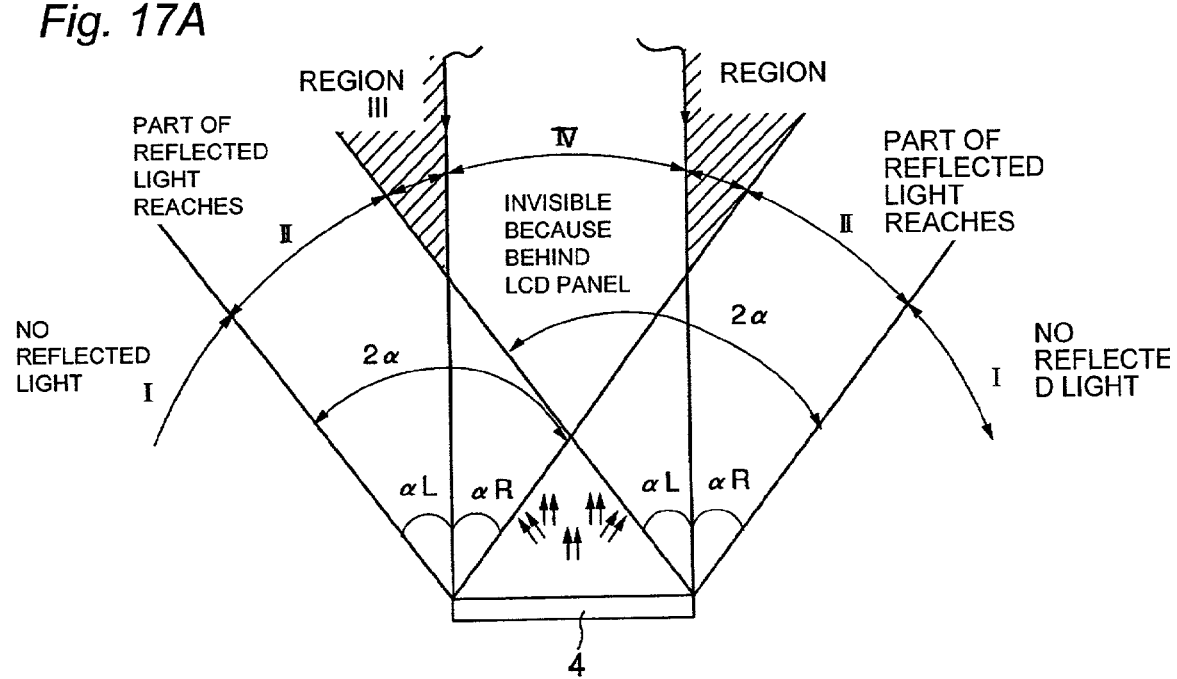
FIGS. 17A and 17B are diagrams illustrating behavior of light reflected from the prior art reflective plate.
Figure 17B:
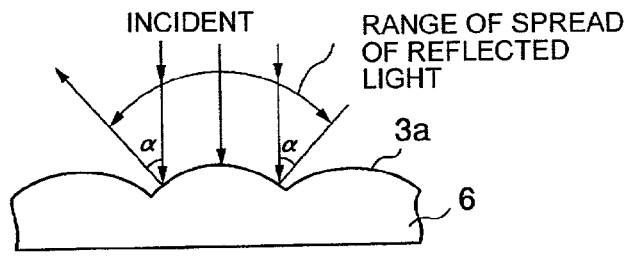

Furthermore, as shown in FIG. 15, the liquid crystal display can be held at an angle to incident light 7 coming from above. The image can be observed at the position of the user 25. At this time, the incident light 7 reflects as reflected light 7a at the surface 2a of the upper substrate 2. Therefore, the light does not reach the user 25. Hence, the monitor screen can be observed clearly.

Of course, the present embodiment is not limited to the aforementioned wireless information transmission device 39. Rather, the embodiment can be applied to every electronic apparatus and device equipped with a reflective liquid crystal display typified by mobile information terminals such as personal digital assistants (PDAs) including electronic notes, mobile computers, and mobile TVs.

As described thus far, the display screen can be made brighter by using the reflective plate of the present embodiment in a reflective liquid crystal display. Where such a reflective LCD is used in a wireless information transmission device or PDA, backlight can be dispensed with. Therefore, power saving can be accomplished. The display can be driven with a battery for a long time. In addition, the device can be made smaller and cheaper. Moreover, the application is not limited to wireless information transmission devices and PDAs. In electronic apparatus or device using such a reflective liquid crystal display as its display, the display screen can be made brighter. The visibility can be improved. Furthermore, directivity is imparted to visual observation and so it is also possible to prevent other persons from peeping from a side.

As described thus far, according to the present invention, light can be collected onto a given surface area by reflective subregions and utilized efficiently. Especially, a given areal region can be totally made bright by using the reflective plate and a display device in combination. In this way, a crisp image can be observed.

What is claimed is:

1. A reflective plate of a liquid crystal display apparatus, comprising:
    a substrate; and
    a reflective layer disposed on the substrate for reflecting incident light, the reflective layer comprising a plurality of reflective sub-regions, each of the sub-regions having at least one reflective surface for reflecting the incident light, wherein
    the reflective surfaces are designed so that light reflected by the reflective surface forms a divergent pencil of rays,
    wherein all of the divergent pencils of rays substantially overlap to form a common light-emitted area at a predetermined distance from the substrate, and
    wherein the common light-emitted area is formed at a position such that a line, parallel with the normal of the reflective plate and passing through a center of the common light-emitted area, does not intersect the reflective plate.

2. The reflective plate of claim 1, wherein reflective surfaces of the plurality of reflective sub-regions are formed such that an angle between light perpendicularly incidenting on a reflective sub-region and light reflected from the reflective sub-region becomes smaller as a position of the reflective sub-region becomes closer to the center of the common region.

3. The reflective plate of claim 1, wherein the reflective sub-region is composed of at least one curved reflective surface.

4. The reflective plate of claim 1, wherein the center of the common light-emitted area is positioned within an imaginary plane that is normal to the substrate and substantially bisects the substrate.

5. A liquid crystal display apparatus, comprising:
    a first substrate;
    a second substrates disposed in parallel with the first substrate at a predetermined distance therefrom;
    a liquid crystal layer disposed between the first substrate and second substrate; and
    a reflective layer disposed on the second substrate underneath the liquid crystal layer, the reflective layer comprising a plurality of reflective sub-regions, each of the reflective sub-regions comprising at least one reflective surface for reflecting light;
    wherein the reflected surfaces are designed so that light reflected by the reflective surface forms a divergent pencil of rays,
    wherein all of the divergent pencils of rays substantially overlap to form a common light-emitted area at a predetermined distance from the second substrate, and
    wherein the common light-emitted area is formed at a position such that a line, parallel with the normal of the reflective plate and passing through a center of the common light-emitted area, does not intersect the reflective plate.

6. An electronic device comprising
    a liquid crystal display apparatus,
    means for transmitting information,
    the liquid crystal display apparatus comprising:
    a first substrate;
    a second substrate disposed in parallel with the first substrate at a predetermined distance therefrom;
    a liquid crystal layer disposed between the first substrate and second substrate; and
    a reflective layer disposed on the second substrate underneath the liquid crystal layer, the reflective layer comprising a plurality of reflective sub-regions, each of the reflective sub-regions comprising at least one reflective surface for reflecting light;
    wherein the reflective surfaces are designed so that light reflected by the reflective surface forms a divergent pencil of rays,
    wherein all of the divergent pencils of rays substantially overlap to form a common light-emitted area at a predetermined distance from the second substrate, and
    wherein the common light-emmitted area is formed at a position such that a line, parallel with the normal of the reflective layer and passing through a center of the common light-emitted area, does not intersect the reflective layer.

* * * * *